(12) United States Patent
Strang (10) Patent No.: US 11,566,445 B2
(45) Date of Patent: Jan. 31, 2023

(54) ELECTRONIC BOLT FOR CARGO CONTAINERS

(71) Applicant: Falcon Lair Pty. Ltd., Red Hill (AU)

(72) Inventor: Sallie Louise Strang, Red Hill (AU)

(73) Assignee: FALCON LAIR PTY. LTD., Red Hill (AU)

( * ) Notice: Subject to any disclaimer, the term of this patent is extended or adjusted under 35 U.S.C. 154(b) by 262 days.

(21) Appl. No.: 16/906,579

(22) Filed: Jun. 19, 2020

(65) Prior Publication Data

US 2020/0325703 A1 Oct. 15, 2020

Related U.S. Application Data

(63) Continuation-in-part of application No. PCT/AU2019/051093, filed on Oct. 10, 2019.

(30) Foreign Application Priority Data

Apr. 9, 2019 (AU) .................................. 2019901203

(51) Int. Cl.
  *E05B 39/00* (2006.01)
  *E05B 45/06* (2006.01)
  (Continued)

(52) U.S. Cl.
  CPC ............ *E05B 39/005* (2013.01); *E05B 39/02* (2013.01); *E05B 45/06* (2013.01); *E05B 83/02* (2013.01);
  (Continued)

(58) Field of Classification Search
  CPC ........ E05B 39/005; E05B 39/02; E05B 45/06; E05B 45/12; E05B 2045/064;
  (Continued)

(56) References Cited

U.S. PATENT DOCUMENTS 6,069,563 A * 5/2000 Kadner .............. G08B 13/1409
  340/541
6,753,775 B2 * 6/2004 Auerbach ............. E05B 39/005
  340/539.22
(Continued)

FOREIGN PATENT DOCUMENTS

CN 210443130 U 5/2020
EP 3064678 A1 9/2016
(Continued)

OTHER PUBLICATIONS

PCT; App. No PCT/AU2019/051093; International Search Report and Written Opinion dated Dec. 20, 2019.
(Continued)

*Primary Examiner* — Christopher J Boswell
(74) *Attorney, Agent, or Firm* — Fitch, Even, Tabin & Flannery LLP (57) ABSTRACT

An electronic bolt seal assembly for locking a hasp of a cargo container, the assembly comprising: a bolt member comprising a head and an elongate shank extending therefrom; a locking body with a housing comprising a cavity for engaging the shank of the bolt member such that during use in a locking configuration the locking body is operable to lock the shank to the locking body in response to axial displacement of the shank within the housing; an electronic module arranged at or adjacent the head in a housing, the electronic module having one or more tracking and communication devices and an electronic circuit to communicate the electronic bolt seal assembly's location to a remote communication center wherein the one or more sensors further comprise an accelerometer for sensing movement and orientation of the bolt member.

17 Claims, 10 Drawing Sheets

(51) Int. Cl.
  *E05B 83/02* (2014.01)
  *E05B 39/02* (2006.01)
(52) U.S. Cl.
  CPC . *E05B 2045/064* (2013.01); *E05B 2045/0665* (2013.01)
(58) Field of Classification Search
  CPC ....... E05B 2045/065; E05B 2045/0665; E05B 2045/0695; E05B 83/02
  See application file for complete search history.

(56) References Cited

U.S. PATENT DOCUMENTS

| | | | | |
|---|---|---|---|---|
| 7,042,354 B2* | 5/2006 | Auerbach | .......... | G08B 13/1445 340/568.2 |
| 7,375,619 B2* | 5/2008 | Auerbach | ............ | E05B 39/005 340/426.25 |
| 7,411,495 B2* | 8/2008 | Auerbach | ............ | E05B 39/005 340/568.2 |
| 7,557,706 B2* | 7/2009 | Brown | ................ | B65D 88/121 340/542 |
| 7,884,711 B2* | 2/2011 | Bao | ..................... | G08B 13/149 340/545.1 |
| 8,487,768 B2* | 7/2013 | Lee | ..................... | G08B 13/126 235/382 |
| 9,940,491 B2* | 4/2018 | Lim | ...................... | E05B 39/005 |
| 10,109,221 B2* | 10/2018 | Yazdi | ................... | E05B 45/005 |
| 10,267,061 B2* | 4/2019 | Hage | ...................... | E05B 45/08 |
| 10,510,272 B1* | 12/2019 | Chen | ..................... | E05B 39/005 |
| 10,815,694 B2* | 10/2020 | Mullis | ............. | G06K 19/07798 |
| 2005/0212671 A1 | 9/2005 | Auerbach et al. | | |
| 2009/0066503 A1 | 3/2009 | Lin | | |
| 2009/0072554 A1 | 3/2009 | Arguin | | |
| 2009/0151406 A1 | 6/2009 | Bao et al. | | |
| 2011/0273852 A1 | 11/2011 | Debrody | | |
| 2013/0049964 A1 | 2/2013 | Lee et al. | | |
| 2014/0183266 A1 | 7/2014 | Lee et al. | | |
| 2014/0210615 A1 | 7/2014 | Chen | | |
| 2017/0103683 A1 | 4/2017 | Yazdi et al. | | |
| 2018/0171665 A1 | 6/2018 | Anderson | | |

FOREIGN PATENT DOCUMENTS

| | | |
|---|---|---|
| WO | 2017082823 A1 | 5/2017 |
| WO | 2020206486 A1 | 10/2020 |

OTHER PUBLICATIONS

PCT; App No. PCT/AU2021/050609; International Search Report and Written Opinion dated Sep. 1, 2021.

* cited by examiner

ELECTRONIC BOLT FOR CARGO CONTAINERS

TECHNICAL FIELD

The present invention relates to an electronic bolt seal assembly for use with cargo containers or cargo transporting units such as but not limited to shipping containers.

BACKGROUND

Any references to methods, apparatus or documents of the prior art are not to be taken as constituting any evidence or admission that they formed, or form part of the common general knowledge.

Cargo transporting units such as cargo containers are widely employed in the transportation industry. Typically, containers have doors which are locked shut using hasps and secured using seals. One type of commonly used seal is a bolt seal. Such a bolt seal typically comprises a bolt having a head and a shank whereby the shank is locked into a locking device. When the shank is inserted into the locking device, the shank is permanently locked into the locking body.

Cargo containers are shipped via land, sea and air transportation and are subject to tampering and vandalism. It is important that such tampering be immediately noted to preclude theft of valuable cargo. To assist in such theft and tampering prevention, prior art seals are assigned serial numbers. These seals are then assigned and locked to the assigned container. The serial number, container number, the carrier, and the location of the cargo are recorded manually or entered into a local computer. The entry then is manually made to show that the container is being shipped out of that location. Should a seal be tampered with, this most likely will occur at a different time and different location. In view of the above, it is desirable to provide a bolt assembly for a cargo container that can be used for tracking the location and monitoring the movement of a cargo container. It would also be desirable to track the sealing status of a cargo container. It would also be desirable to have instruments measure the cargo container's experiences throughout its journey. It is also desirable to provide an improved bolt assembly that is easy to use and implement and does not require extensive training or expertise for workers to adopt the usage of the improved bolt assembly.

SUMMARY OF INVENTION

In an aspect, the invention provides an electronic bolt seal assembly for locking a hasp of a cargo container, the assembly comprising:
- a bolt member comprising a head and an elongate shank extending therefrom;
- a locking body with a housing comprising a cavity for engaging the shank of the bolt member such that during use in a locking configuration the locking body is operable to lock the shank to the locking body in response to axial displacement of the shank within the housing;
- an electronic module arranged at or adjacent the head in a housing, the electronic module having one or more tracking, and communication devices and an electronic circuit to communicate the electronic bolt seal assembly's location to a remote communication center.

In an embodiment, the locking body is frangibly attached relative to the housing in an initial non-activated configuration and wherein detachment of the locking body from the housing effects actuation of the electronic module.

In an embodiment, the electronic module comprises an actuator adapted to be operationally coupled with the frangibly attached locking body.

In an embodiment, the actuator comprises a reed switch switchable by a magnetic field.

In an embodiment, the locking body comprises a magnetic member to provide said magnetic field wherein detachment of the locking body from the housing change in the magnetic field surrounding said reed switch.

In an embodiment, the reed switch is positioned along a side wall of the housing to be in close proximity with the frangibly attached locking body.

In an embodiment, the magnetic member is arranged to be adjacent to an attachment location where the locking body is frangibly attached to the housing.

In an embodiment, the electronic module further comprises one or more sensing arrangements for sensing the integrity of the bolt in the locked position whereby any tampering of the bolt in the locking configuration is sensed by the sensing arrangement and information related to the tampering is communicated to the remote communication center.

In an embodiment, the electronic bolt assembly further comprises one or more processing units arranged to be communication with the sensing arrangement to receive and process information relating to any tampering of the bolt, the processing units comprising one or more communication devices to transmit the processed information related to the tampering of the bolt to the communication center.

In an embodiment, the one or more sensing arrangements comprises an electrical connection between the electronic module and a conducting member extending along a length of the shank whereby changes or disruption in electrical connectivity between the electronic module and the conducting member results in information related to the change or disruption being communicated to the remote communication centre.

In an embodiment, the conducting member is located between an interior portion of the shank and an outer sleeve, the conducting member extending substantially along the length of the shank with a first segment of the conducting member extending from a first proximal portion of the shank the head towards a second distal portion of the shank and a second segment of the conducting member extending from the second distal portion of the shank towards the first proximal portion of the shank and wherein the first and second segments form a continuous length of the conducting member.

In an embodiment, the one or more sensors further comprise an accelerometer and/or compass and/or gyroscope for sensing movement and orientation of the bolt.

In an embodiment, the electronic bolt assembly in accordance with any one of the preceding claims further comprising a global positioning system (GPS) receiving unit coupled to an electronic circuit of the electronic module for receiving and processing electronic bolt positioning signals from GPS satellites.

In an embodiment, the housing comprises an outwardly projecting hollow cavity for accommodating an antenna operably coupled with the GPS receiving unit.

In an embodiment, the housing is shaped to prevent the shank from being engaged with the hasp of a cargo container in an undesirable orientation thereby preventing outer walls of the housing defining the hollow cavity for the antenna from being positioned in close proximity with outer walls of the container.

In an embodiment, during use, the head of the bolt and the associated housing is adapted to be positioned at a greater elevation relative to the locking body in the locked configuration.

In an embodiment, the communication device comprises a cellular phone communications unit coupled to an electronic circuit, the cellular phone communications unit being arranged to communicate with the communications center via cellular towers.

In an embodiment, the electronic module is powered by one or more batteries.

In an embodiment, the electronic bolt assembly comprises a cellular modem coupled to an electronic circuit of the electronic module for communicating position data to a cellular network; and a global positioning system (GPS) receiver coupled to the electronic circuit of the electronic module for receiving and processing position data from GPS satellites whereby the tracking and communication devices further comprise a processor coupled to the GPS receiver and the cellular modem and programmed to control operation of the GPS receiver and the cellular modem.

In an embodiment, the tracking and communication devices comprise a global positioning system (GPS) receiver coupled to the electronic circuit of the electronic module for receiving and processing position data from GPS satellites; and a small satellite (smallsat) receiver coupled to the electronic circuit of the electronic module for communicating with a small satellite network.

In an embodiment, the tracking and communication devices comprise a global positioning system (GPS) receiver coupled to the electronic circuit of the electronic module for receiving and processing position data from GPS satellites; a small satellite (smallsat) receiver coupled to the electronic circuit of the electronic module for communicating with a communication satellite network; and a cellular modem coupled to an electronic circuit of the electronic module for communicating position data to a cellular network.

In an embodiment, the tracking and communication devices further comprising a processor coupled to the GPS receiver, the small satellite receiver and the cellular modem and programmed to control the GPS receiver, the small satellite receiver and the cellular modem.

In an embodiment, the processor is programmed to monitor and control the GPS receiver, the small satellite receiver and the cellular modem, whereby the processor monitors a signal quality for each of the GPS receiver, the small satellite receiver and the cellular modem and prioritises and/or controls communication from any one or more of the GPS receiver, the small satellite receiver and the cellular modem based on one or more parameters associated with the signal quality.

In an embodiment, the processor is in communication with a memory device with machine readable rules written on the memory device comprising instructions to select any one of the GPS receiver, the small satellite receiver and the cellular modem in response to the signal quality associated with each of the GPS receiver, the small satellite receiver and the cellular modem.

In an embodiment, the machine readable rules comprise instructions to determine which one of the GPS receiver, the small satellite receiver and the cellular modem have the greatest signal strength and then prioritising selection of any one of the GPS receiver, the small satellite receiver and the cellular modem for communication.

In an embodiment, the machine readable rules comprise instructions to determine which one of the GPS receiver, the small satellite receiver and the cellular modem have the greatest signal strength and upon determining that the GPS receiver, the small satellite receiver and the cellular modem have comparable signal strength prioritising selection of the small satellite receiver over the GPS receiver and the cellular modem for communication.

In an embodiment, the small satellite receiver is a Low Power Wide Area Network (LPWAN) modem.

In an embodiment, the LPWAN modem is a Narrowband IoT (NB-IoT) modem.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

FIGS. 1 to 6 illustrate a first embodiment an electronic bolt assembly 100 which is suitable for locking a hasp of a cargo container. The bolt assembly 100 comprises a bolt member 120 having a head 122 enclosing electronic devices (having one or more tracking and communication devices and an electronic circuit to communicate the electronic bolt seal assembly's location to a remote communication center) and an elongate shank 124 which can be permanently locked into a locking body 110. The locking body 110 comprises a housing 111 that is frangibly or tearably attached to a housing 126 for the head 122. The invention described herein is in no way limited to the shape and configuration of the bolt 120 or the locking body 110 and several possible configurations for non-releasable engagement of the bolt 120 with the locking body 110.

In the preferred embodiment, the locking body 110 comprises the housing 111 with a cavity 115 for engaging the tip portion 125 of the shank 124 of the bolt member 120. Typical use required the tearable locking body 110 to be detached from the housing 126 of the head 122 and insert the tip portion 125 of the bolt into the cavity 115 such that the locking body 110 locks the shank 124 to the locking body 110 in a locked position in response to axial displacement of the shank 124 within the cavity 115 provided in the housing 111 of the locking body 110. The locking position has been shown particularly clearly in FIG. 5A.

Figure 1A:
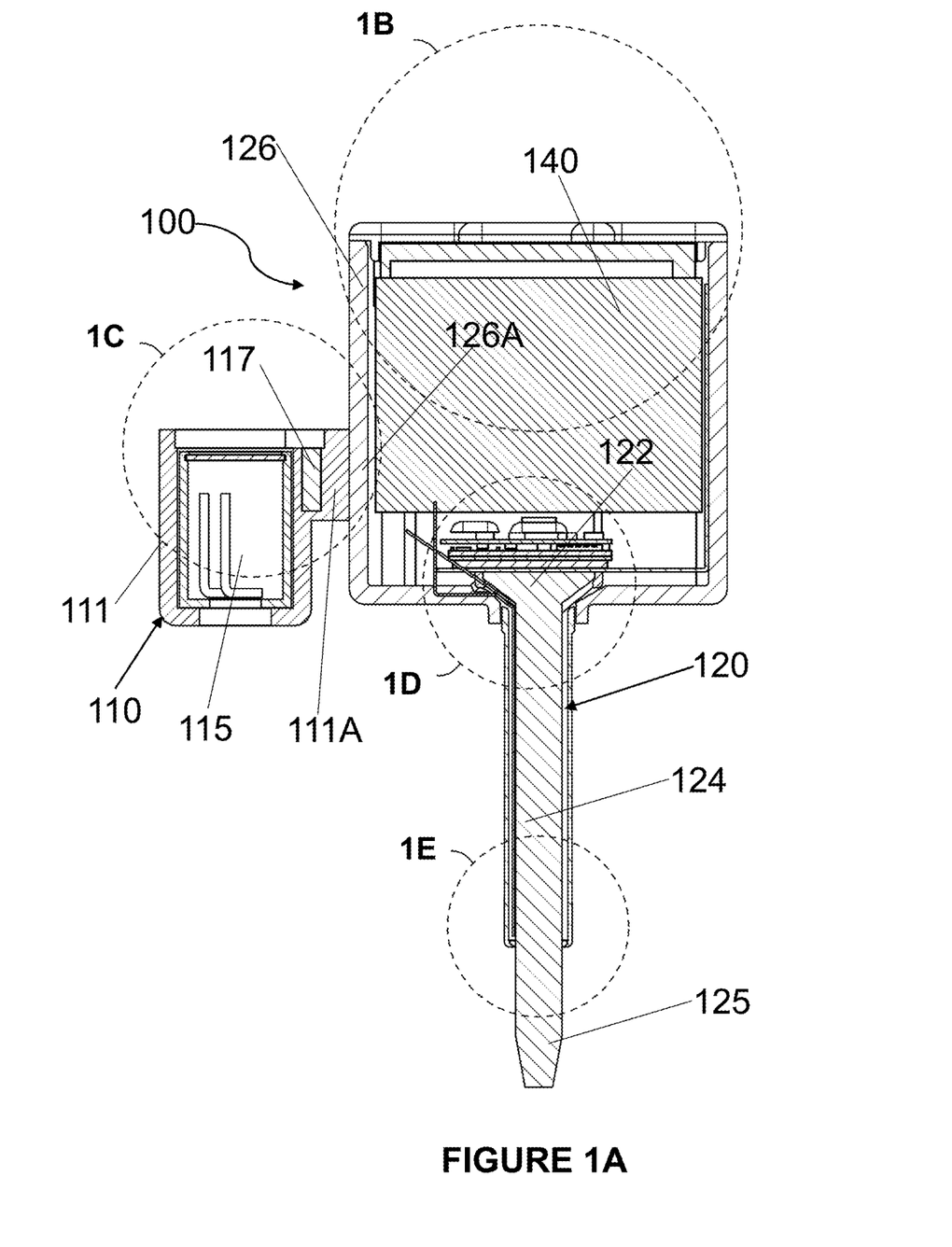
FIG. 1A is a sectional view of an electronic bolt assembly 100 in accordance with an embodiment of the invention.
Figure 1B:
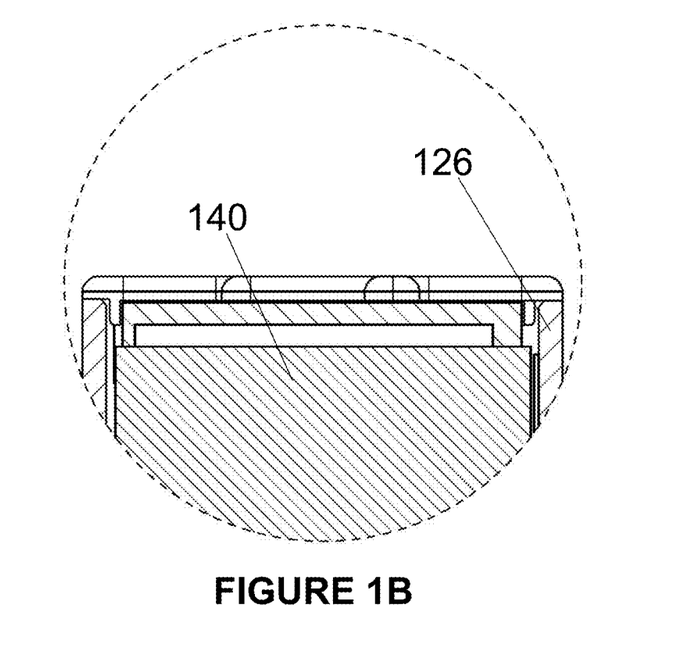
FIGS. 1B, 1C, 1D and 1E are enlarged detailed views for sections 1B, 1C, 1D and 1E shown in FIG. 1A.
Figure 1C:
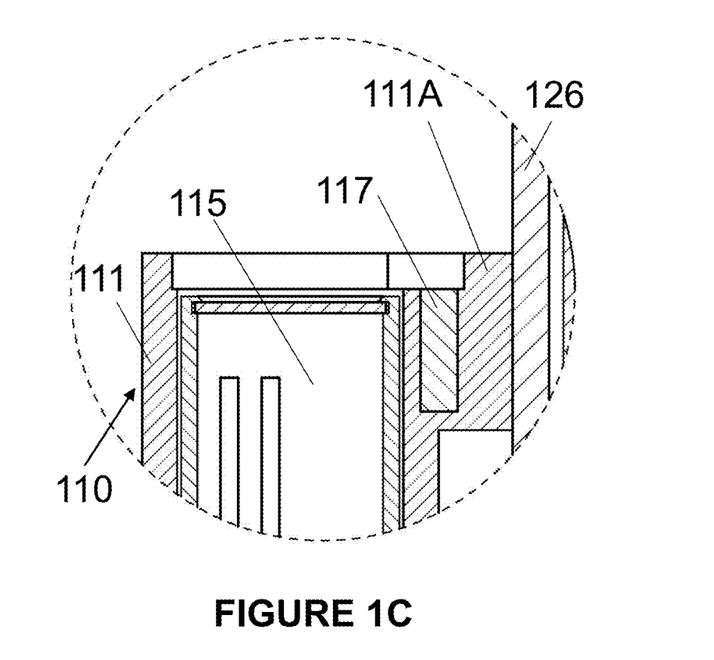

Referring to FIG. 1A, the bolt member 120 comprises a head 122 with the shank 124 extending therefrom with an engagement structure adapted for being locked into permanent engagement with the locking body 110 when the shank 124 is axially displaced along the length of the cavity 115 during the process of insertion of the shank 124 into the cavity 115. The locking arrangement between the shank 124 and the locking body 110 will not be explained in detail and we refer to International Patent Application PCT/AU2019/051093 which outlines a locking arrangement for permanently locking the tip portion 125 of the shank 124 within the cavity 115 of the locking body 110 detached from the housing 126 of the head 122.

Figure 2:
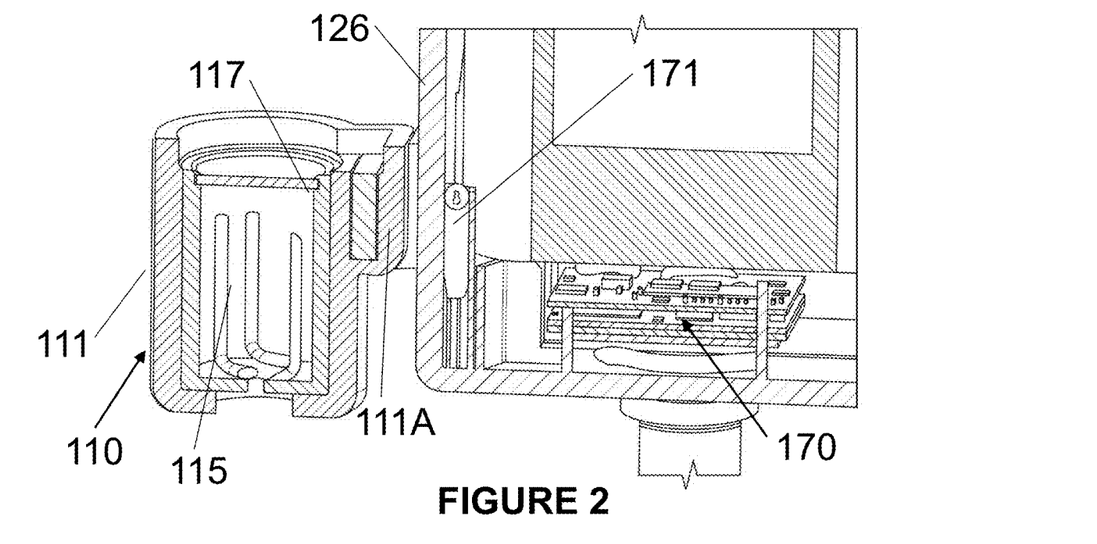
FIG. 2 is a partial sectional view (across a first section) for the electronic housing 126 and the locking body 110 (in the attached configuration).
Figure 3:
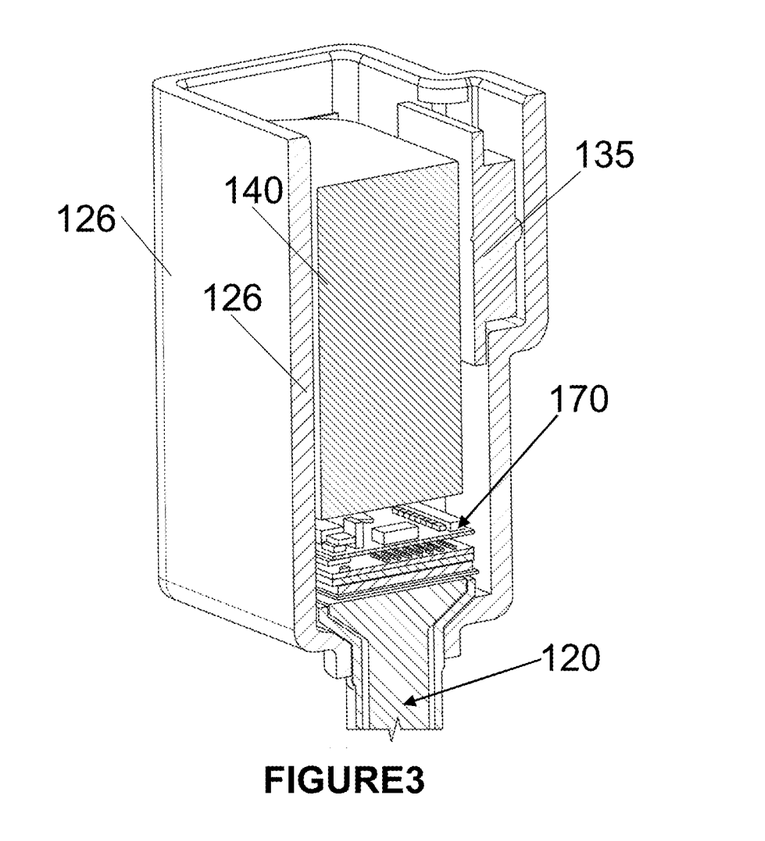
FIG. 3 is a partial sectional view (across a second section) for the electronic housing 126.
Figure 4:
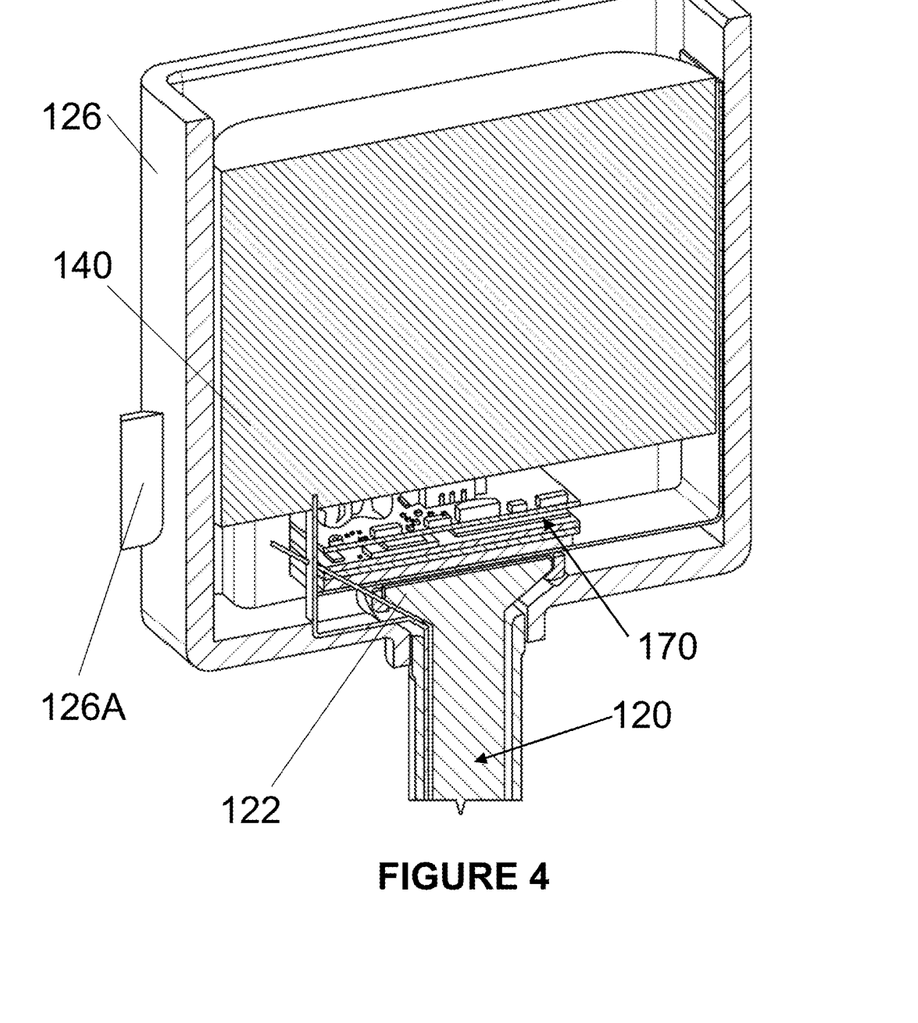
FIG. 4 is a detailed sectional view of the electronic housing 126 (the locking body 110 has been detached).
Figure 5A:
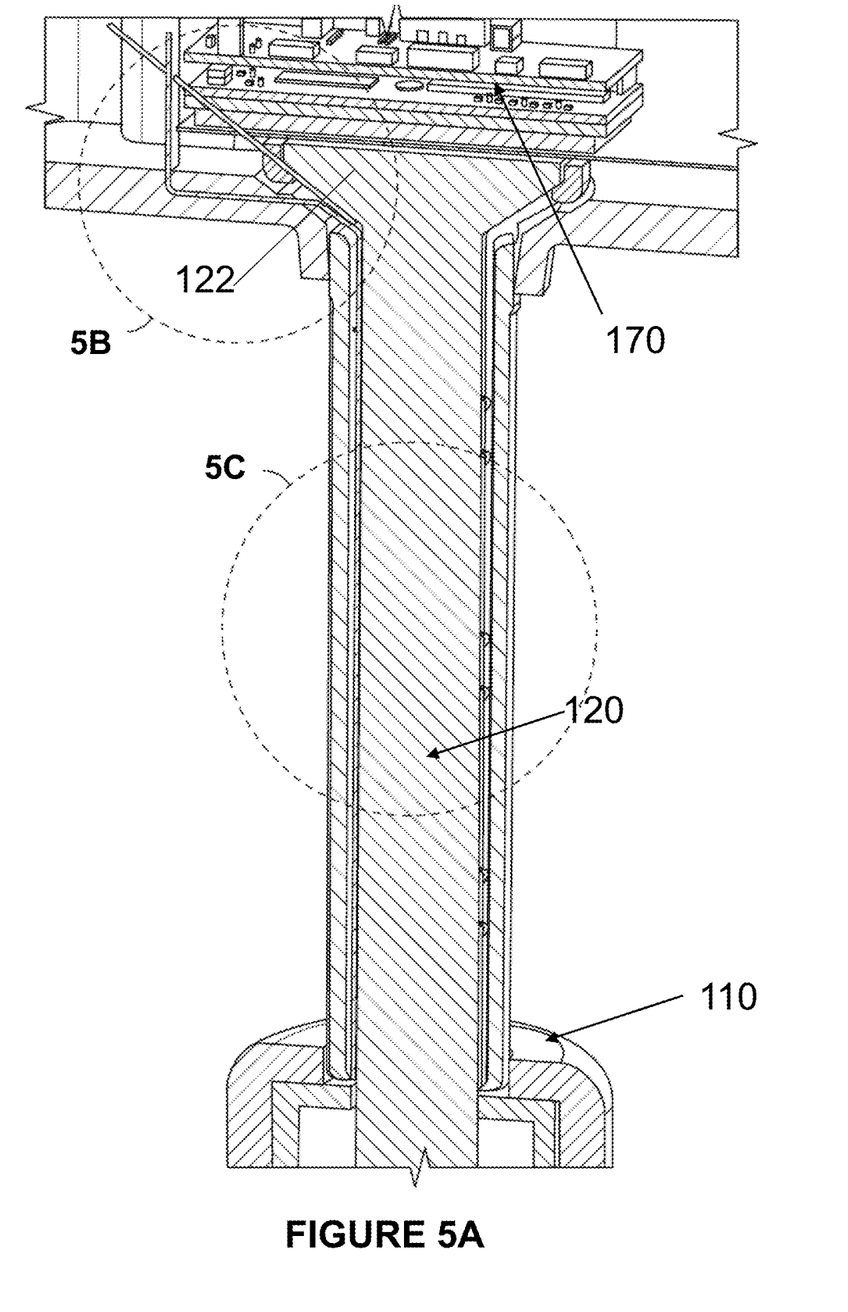
FIG. 5A is a detailed sectional view of the electronic bolt assembly 100 where the locking body 110 has been shown in a locked configuration.
Figure 5B:
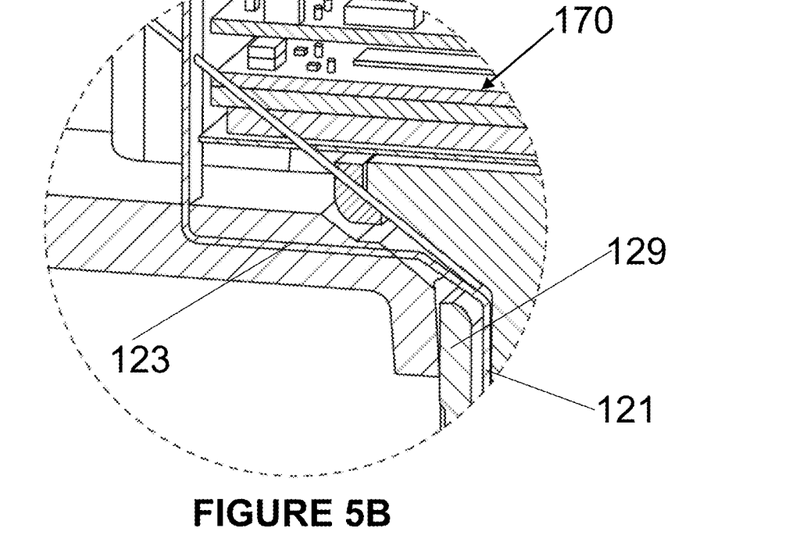
FIGS. 5B and 5C are enlarged sectional views of sections 5B and 5C shown in FIG. 5A.
Figure 5C:
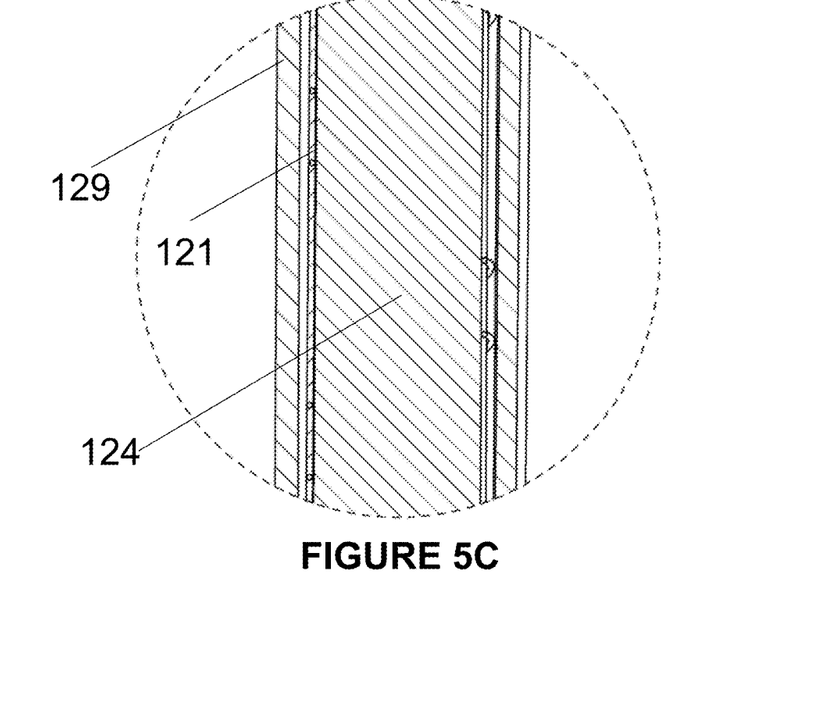
Figure 6:
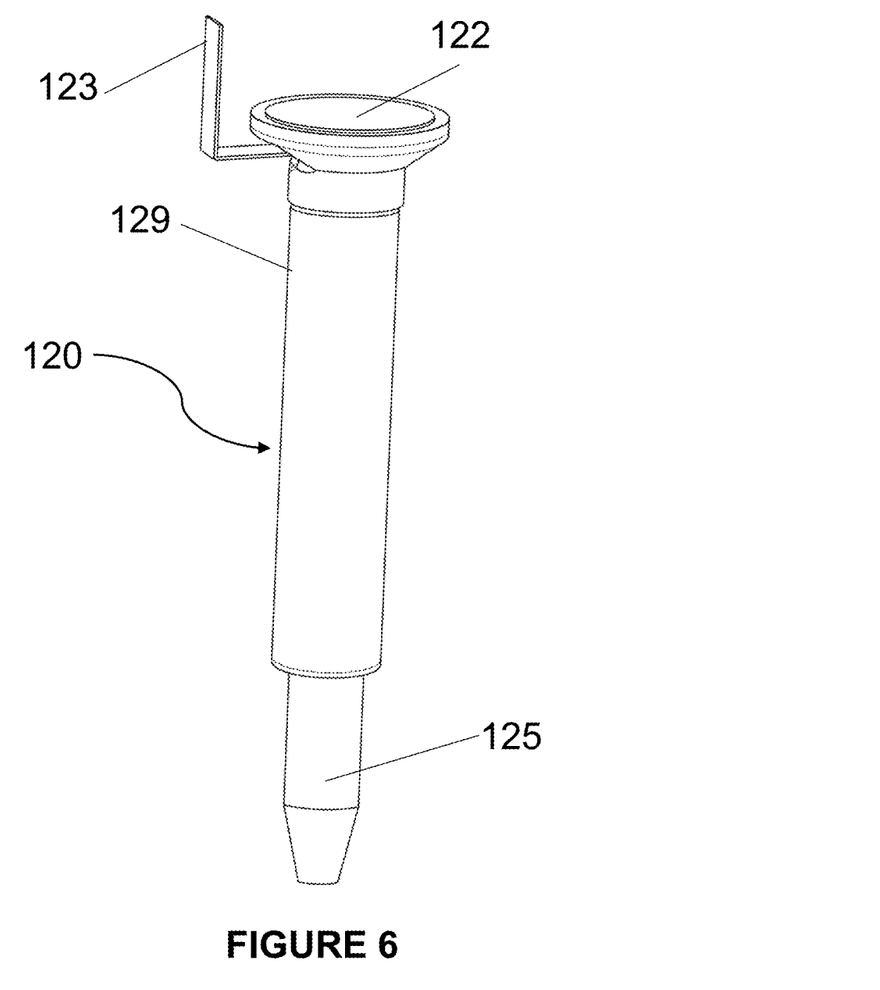
FIG. 6 is an isolated view of the bolt 120.

Referring to FIGS. 1A and 2, the bolt 120 includes the housing 126 that is located at or adjacent the head portion 122 of the bolt 120 which comprises an electronic module 170 which includes tracking and communication devices the functionality of which will be explained in detail in the foregoing sections. Referring to FIG. 1A, the housing 111 of the locking body 110 is frangibly or tearably attached to the housing 126 enclosing the electronic module 170. The electronic module 170 is arranged to be activated by an actuation switch 171 located along inner side walls of the housing 126 for the bolt 120. The actuation switch 171 may be provided in the form of a magnetic reed switch. Magnetic reed switches typically comprise two reeds made of magnetic material so that when magnetic field is applied, the two reeds either contact each other or separate from each other to make or break a contact. In the present embodiment, the actuation switch 171 is arranged to so that when a magnetic field is brought into close proximity with the actuation switch 171, the reeds break from each other to break an electrical contact and keep the electronic module 170 in a deactivated state. The magnetic field in this embodiment is provided by a magnetic member 113 that is located within the housing of the locking body 110. The magnetic member 117 is located in a cavity of the locking body housing 111 such that in the initial attached configuration, the magnetic member 117 is located adjacent a side wall portion 111A of the locking body housing 111 that is frangibly attached to a portion 126A of the electronic housing 126 that lies adjacent to the magnetic actuation switch 171. Once the locking body 110 is torn or detached from the electronic housing 126, the actuation switch 171 activates the electronic devices housed within the electronic housing 126.

Figure 9:
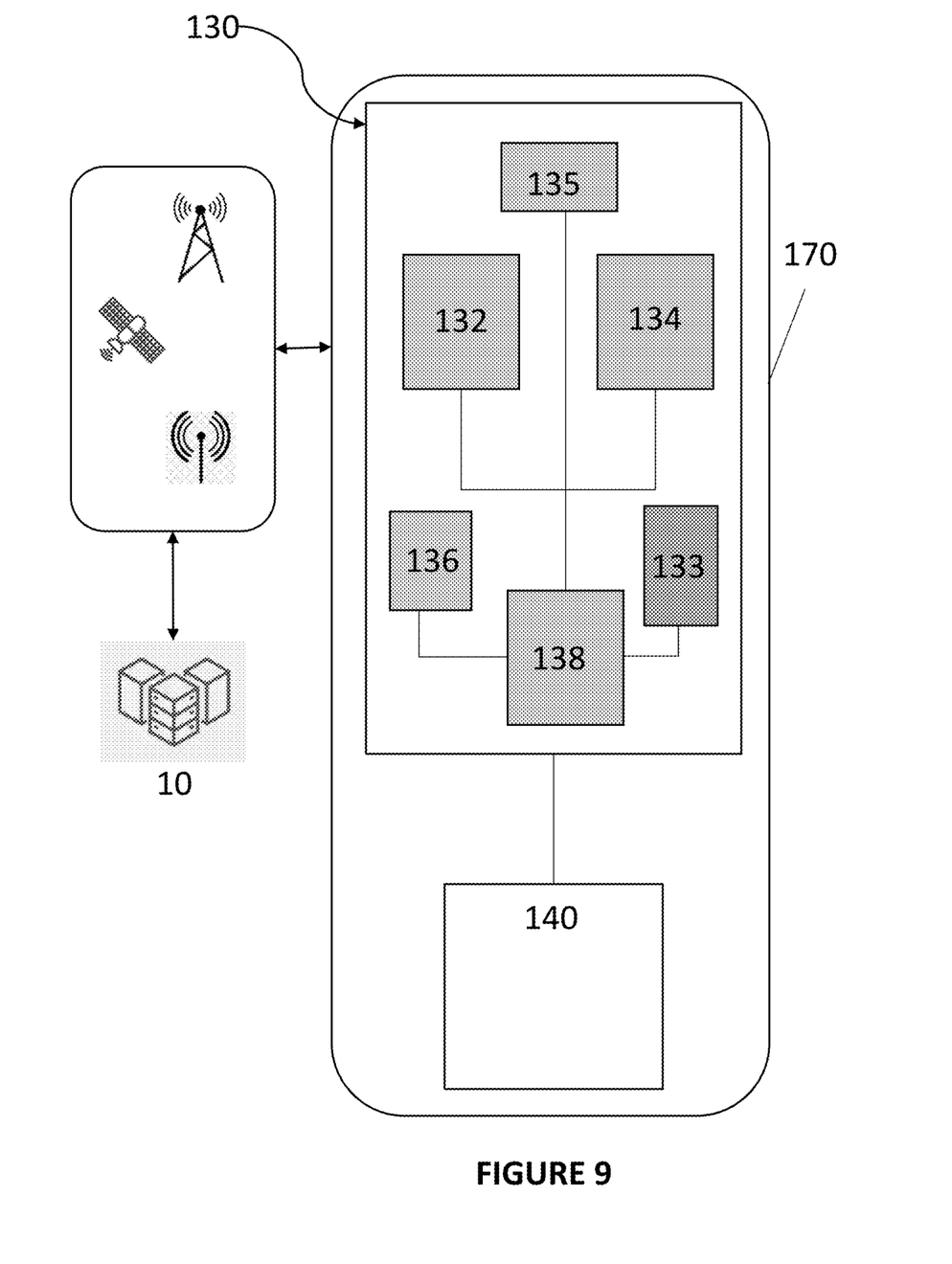
FIG. 9 is a schematic view of the electronic module 170.

In the preferred embodiment, the tracking and communication devices forming a part of the electronic module 170 may include a satellite modem 134, a cellular modem 132 and an antenna module 135 (such as a Global Navigation Satellite System-GNSS module) coupled to a processing unit (such as microprocessor 138) for receiving and processing positioning signals from GPS satellites which indicate the location of the bolt assembly 100 at any given time. Sensors 136 in the form of accelerometers and/or compass and/or gyroscopes may also be additionally be provided to sense the integrity of the bolt 120 in the locked position whereby tampering of the bolt member 120 is sensed by the sensor 136 and information related to any tampering is also processed by the processing unit 138. One of the non-limiting advantages provided by the inclusion of these electronic devices is that information related to tampering or loss of cargo placed in the shipping container initially secured by the electronic bolt seal assembly 100 can be used for audit purposes particularly if insurance is to be claimed by the shipping company or owners of the cargo.

In the preferred embodiment, the small satellite module 134 may be provided in the form of a MYRIOTA satellite module which comprises a software defined radio coupled to the microprocessor 138. The sensors 136 may be capable of sensing any tampering and the microprocessor 138 may be programmed to activate the small satellite module 134 when the sensors 136 detect movements that satisfies any pre-defined criteria. Once the small satellite module 134 is activated, the module 134 is able to communicate with low Earth orbit satellites that typically orbit the earth at an altitude of 600 kms and 800 kms every 90 minutes and can receive data packets from the bolt assembly 100 in regular intervals. It is understood that each low earth satellite visits every part of the globe at least four times a day with typical revisit times ranging between one and three hours.

As previously described, the electronic module 170 also includes a cellular modem 132 which may function in combination with the small satellite module 134 and the antenna module 135. Each of the small satellite module 134, the cellular modem 132 and the antenna module are coupled to the microprocessor 138 for receiving and processing positioning signals (to indicate the location of the bolt seal assembly using the antenna module 135) and transmitting such signals to a remotely located communication centre. Sensors 136 in the form of accelerometers and/or compass and/or gyroscopes are provided to sense the integrity of the bolt 120 in the locked position whereby tampering of the bolt is sensed by the sensor 136 and information related to any tampering is also communicated to and processed by the microprocessor 138. In use, any tampering of the bolt member 120 is sensed by the sensor 136 and the processing unit 138 then transmits information or a signal (such as transmitting the signal "tampered" along with a location detected by the GPS receiving unit 134) to a remote communication center 10 through either the cellular modem 132 (which is in communication with a cellular network) and/or the small satellite received transmitter 134 (which is in communication with low orbit earth satellites).

As the cellular modem 132 can only transmit data when sufficiently close to a cellular network, the bolt assembly 100 may include one or more memory devices (denoted by 133) to at least temporarily store data generated by the antenna module 135 and the sensors 136 in the electronic sub module 170. Once the bolt assembly 100 is within communication range of a cellular network, this data can be transmitted to the remotely located communication center 10 by the cellular modem 132. It is important to note that embodiments of the invention may be provided which include either the cellular modem 132 or the small satellite trans-receiver 134 working in combination with the antenna module 135.

Figure 1D:
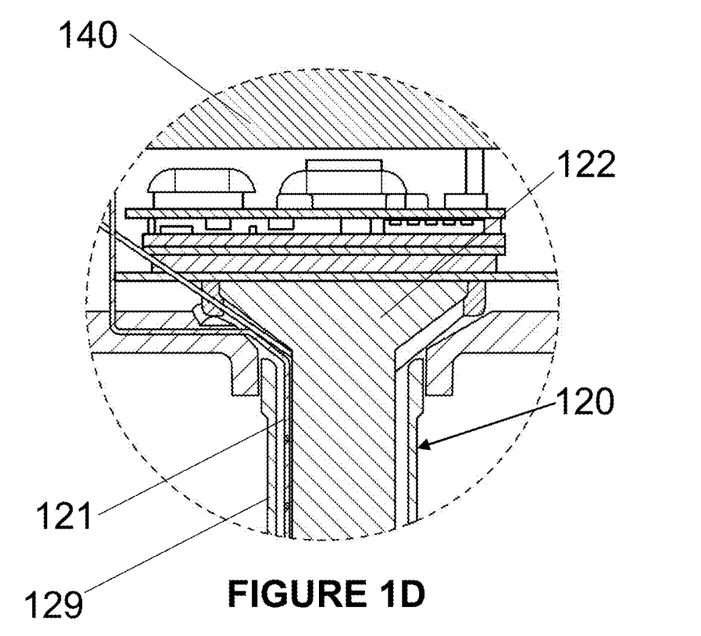
Figure 1E:
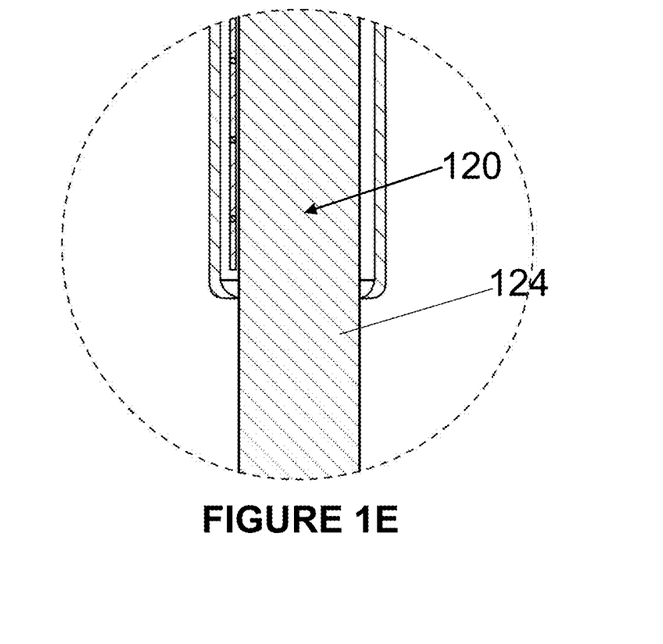

In addition to the sensor 136, a wire sensor may also be provided along the length of the shank 124. Any tampering in the shank 124 (which is the most common way by which bolt seals are likely to be tampered) would result in the breakage of the wire sensor thereby triggering the alarm or sending a notification to a remotely located user. It is important to note that need for the provision of the sensor 136 (such as an accelerometer) is not negated by the provision of the wire sensor and the assembly 100 may provide the sensor 136 and/or the wire sensor. The wire sensor is provided in the form of a conductive wire 121 that runs along the length of the elongate shank 124 and establishes an electrical connection between two terminals on the electronic module whereby changes or disruption in electrical connectivity along the length of the conductive wire results in information related to the change or disruption being communicated to the remote communication centre. Turning to FIGS. 1D, 1E the conducting wire 121 is relatively flexible and is located between an interior portion of the shank 124 and an outer sleeve 129. The conducting wire 121 extends substantially along the length of the shank 124 with a first segment of the conducting wire 121 extending from a first proximal portion of the shank (relative to the head) towards a second distal portion of the shank and a second segment of the conducting wire 121 extending from the second distal portion of the shank towards the first proximal portion of the shank with the first and second segments forming a continuous length of the conducting wire along the shank 124. Both ends of the conducting wire 121 are connected to the electronic module 170 via a connecting tab 123 and any breakage of the shank results in loss of electrical conduction between the two electrically connected ends of conducting wire 121. The signal from the microprocessor 138 may also be provided in the form of an alarm that could be transmitted to the remotely located communication center 10. The tampering may then be recorded at the remote communication center 10 by reading the transmitted signal at different shipping and receiving points by noting the GPS location recorded and processed by the microprocessor 138 of the bolt seal assembly 300. It will be appreciated that the GPS antenna module 135 may determine the location of the bolt seal assembly 100 by conventional GPS technology.

As mentioned above, the tampered state of the seal and its location at which it is tampered with is communicated to the central communication center 10 by the cellular modem 132. In the event that the GPS antenna module 135 is unable to obtain a stable signal from a GPS satellite, the microprocessor 138 may detect the low signal quality of the antenna module 135 and instruct the cellular modem 132 to obtain position data by communicating with one or cellular networks located in the vicinity of the bolt seal assembly 100.

The electronic module 170 carries out monitoring and tracking of the bolt seal assembly 100. In the preferred embodiment, the seal status is monitored and tracked via a cellular telephone communications network or by using a small satellite network. The cellular modem 132 may take the form of a cellular modem such as a UBlox SARA-R410M or UBlox SARA-R412M modem. The small satellite trans-receiver 134 is in the form of a Myriota satellite module. When the cellular modem 132 and the small satellite module trans-receiver 134 are used in combination, the microprocessor 138 may select one of the cellular modem 132 or the small satellite trans-receiver 134 for carrying out communication with the remotely located communication centre. Memory devices (not shown) may be arranged in electronic communication with the microprocessor 138 in the electronic circuit may store the data generated by the various devices in the electronic module 170 and this date may be retrieved by a controller and optionally transmitted to the remotely located communication center 10.

In use, the microprocessor 138 may optimise performance of the bolt assembly 100 by monitoring and utilising the communication devices as required. The microprocessor 138 may monitor the signal strength of each of the cellular modem 132 and the small satellite receiver 134 and select which device to operate to transmit position and seal state data. For example, if the small satellite receiver 134 has a strong signal with a low orbiting satellite but the cellular modem 132 is unable to locate any cellular networks, the microprocessor 138 may deactivate the cellular modem 132 temporarily (to save power) and transmit all data via the small satellite receiver 134. In another example, the microprocessor 138 may, when appropriate to do so, transmit data primarily or exclusively using small satellite receiver 134 and only use the cellular modem 132 when the small satellite receiver 134 is not able to communicate with low orbit earth satellites. In other scenarios, when the cellular modem 132 has an insufficiently stable signal, the microprocessor 138 may deactivate the cellular modem 132 to preserve battery capacity and may only operate the small satellite receiver 134. In other embodiments, the small satellite receiver 134 may be set as the default communication device whereby the microprocessor 138 only activates the cellular modem 132 when the small satellite trans-receiver 134 is unable to communicate with low orbit earth satellites. Small satellite trans-receiving modules usually consume lower amounts of power and it is therefore preferable in some non-limiting embodiments to set up the satellite trans-receiver 134 as the default communication device. In other embodiments, a user may select the small satellite trans-receiver 134 or the cellular modem 132 as a default communication device to minimise or optimise expensive data transmission costs.

The microprocessor 138, in some embodiments, may be programmed to detect a seal state of the bolt assembly 100 using the sensors 136 at predetermined intervals (for example, every 5 minutes). Simultaneously, the microprocessor 138 may also use the GPS antenna module 135 to receive position data for the bolt seal assembly 100. In combination, in the event of tampering, this position data along with the seal state would allow a user to determine when tampering took place during transit. In this particular embodiment, the position data and seal state can be transmitted to the remote communication center 10 at each interval using the small satellite receiver 134. Once the bolt assembly 100 is within range of a cellular network, the tracking and communication device may switch to using the cellular modem 132 to minimise data transmission costs.

While the examples above use a 5 minute interval, it will be appreciated that the interval could be any amount of time and, in particular, could be performed every second, minute or hour, as required.

In some embodiments, the microprocessor 138 may be programmed to detect a seal state of the bolt assembly 100 using sensors 136 and concurrently detect an associated position using GPS antenna module 135 every second. The seal state and associated position may then be stored in digital memory 133. The microprocessor 138 may then be further programmed to transmit, using either the small satellite receiver 134 or the cellular modem 132, the seal state and associated position data after a predefined number of seconds (for instance, every 600 seconds/10 minutes) to the remote communication center 10.

Advantageously, some embodiments of the bolt assembly 100 described herein may provide the ability to monitor the status of the seal of the bolt assembly in real time, either through a satellite receiver or a cellular modem.

In some particularly preferred embodiments, the cellular modems and communication devices described herein utilise Low Power Wide Area Network (LPWAN) technology and, more specifically, utilise the Narrowband Internet of Things (NB-IoT) radio technology standard. In some embodiments, the cellular modems and cellular communication technology described herein will utilise a combination of LPWAN technology and second-generation (2G) cellular technology, such as the GSM standard, for example. It will of course be appreciated that the cellular technology utilised in the embodiments of the invention can be any suitable cellular technology or mix of cellular technologies such as LTE Cat-M1, Cat-M2, NB-IoT, Quad Band GSM, etc.

Power supply 140 forms part of the electronic module 170 which is provided within the housing 126 of the bolt 120 for bolt seal assembly 100. One or more batteries form a part of the power supply 140 which powers the various devices of the electronic module 170, particularly the small satellite trans-receiver 134, the cellular modem 132 and the GPS antenna module 135. In some embodiments, the power supply 140 may be provided in the form of rechargeable batteries. In some embodiments, the processing unit 138 may be pre-programmed to update seal status based upon any impacts or forces sensed by the accelerometer sensor 136 that may be in response to a tampering force above a pre-determined threshold during unauthorised tampering of the bolt seal assembly 100. In some other embodiments, the processing unit 138 may also be programmed to update the sealing status during and after a free fall of the bolt seal assembly 100. Furthermore, the processing unit 138 may also be programmed to increase the ping rate once a specific event has occurred. Other power sources may also be used for powering the devices of the electronic module 170. A power saving feature may also be provided to keep the bolt seal assembly in a low power or switched off mode. The actuating switch 171 maintains the electronic module in an "off" or inactive state and only when the locking body 110 is frangibly detached from the electronic housing 126 is the electronic module 172 toggled into an activated state.

The location of the electrical module 170 in the housing of the bolt member 120 allows the bolt member 120 to be re-used. The locking body 110 may be provided in the form of a single-use product whereby, the once the locking body 110 is separated from the bolt member 120, the power supply 140 is de-activated and no longer suitable for use. In another exemplary embodiment, the tracking and communication devices in the electronic module 170 may be disabled once the locking body 110 is separated from the bolt member 120. The electronic module 170 may be enclosed in moulded thermoplastic material that forms the locking body and allows the electronic components of the electronic module 170 to be shielded from the outside.

Figure 7:
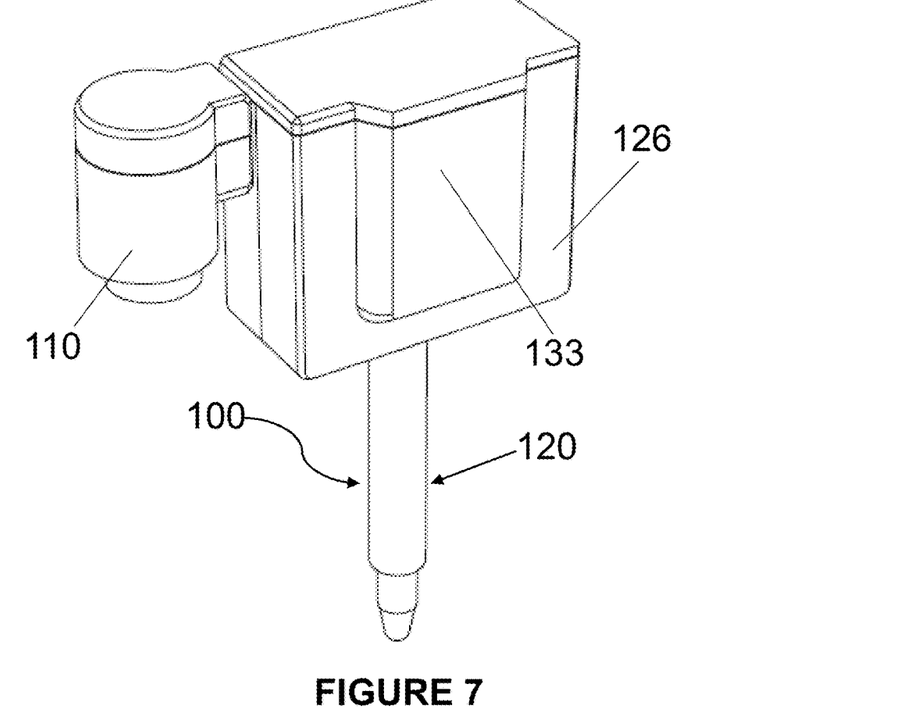
FIG. 7 is a perspective view of the electronic bolt assembly 100 where the locking body 110 has been frangibly attached to an in-use upper portion of the electronic housing 126.
Figure 8:
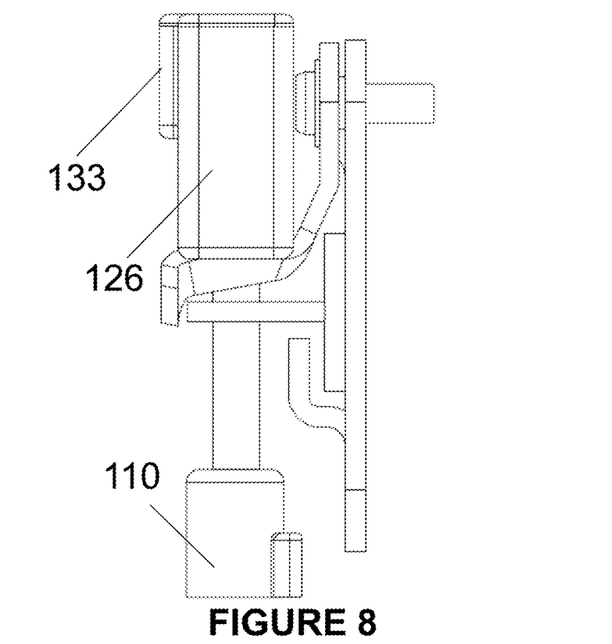
FIG. 8 is a side view of the electronic bolt 100 shown in an in-use configuration in a locked position.

Finally, the antenna module 135 in the preferred embodiment is located within a hollow outwardly projecting cavity 133 for accommodating the antenna module 135. The housing 126 particularly the portion forming the cavity 133 is shaped to prevent the shank 122 from being engaged with the hasp of a cargo container in an undesirable orientation thereby preventing outer walls of the housing 126 defining the hollow cavity 133 for the antenna module 135 from being positioned in close proximity with outer walls of the container during use. FIGS. 7 and 8 in particular show that external walls of the housing 126 may be provided with indicia to guide users for ensuring that the cavity 133 faces outwardly during use and that the antenna module 135, during use, is not arranged to be positioned adjacent external walls of a shipping container. For the optimised working of the electronic module 170 it is also recommended that during use the head 122 of the bolt 120 and the associated housing 126 is positioned at a greater elevation relative to the locking body 110 in the locked configuration (once the locking body 110 has been detached).

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An electronic bolt seal assembly for locking a hasp of a cargo container, the assembly comprising:
   a bolt member comprising a head and an elongate shank extending therefrom;
   a locking body comprising a cavity for engaging the shank of the bolt member such that during use in a locking configuration the locking body is operable to lock the shank to the locking body in response to axial displacement of the shank within the cavity;
   an electronic module arranged at or adjacent the head in an electronic module housing, the electronic module comprising:
      an actuator comprising a reed switch switchable by a magnetic field;
      one or more tracking and communication devices; and
      an electronic circuit to communicate the electronic bolt seal assembly's location to a remote communication center; and
   a magnetic member to provide said magnetic field;
   wherein the locking body is frangibly attached relative to the electronic module housing in an initial non-activated configuration, and wherein frangible detachment of the locking body from the electronic module housing effects actuation of the electronic module and results in a change in the magnetic field surrounding said reed switch.

2. An electronic bolt seal assembly in accordance with claim 1 wherein the locking body is frangibly attached to the housing in the initial non-activated configuration.

3. An electronic bolt seal assembly in accordance with claim 2 wherein the actuator is adapted to be operationally coupled with the frangibly attached locking body.

4. An electronic bolt seal assembly in accordance with claim 1 wherein the reed switch is positioned along a side wall of the housing to be in close proximity with the frangibly attached locking body.

5. An electronic bolt seal assembly in accordance with claim 1 wherein the magnetic member is arranged to be adjacent to an attachment location where the locking body is frangibly attached to the housing.

6. An electronic bolt seal assembly in accordance with claim 1 wherein the electronic module further comprises one or more sensing arrangements for sensing the integrity of the bolt in the locking configuration whereby any tampering of the bolt in the locking configuration is sensed by the one or more sensing arrangements and information related to the tampering is communicated to the remote communication center.

7. An electronic bolt seal assembly in accordance with claim 6 further comprising one or more processing units arranged to be communication with the one or more sensing arrangements to receive and process information relating to any tampering of the bolt, the processing units comprising one or more communication devices to transmit the processed information related to the tampering of the bolt to the communication center.

8. An electronic bolt seal assembly in accordance with claim 6 wherein the one or more sensing arrangements comprises an electrical connection between the electronic module and a conducting member extending along a length of the shank whereby changes or disruption in electrical connectivity between the electronic module and the conducting member results in information related to the change or disruption being communicated to the remote communication center.

9. An electronic bolt seal assembly in accordance with claim 8 wherein the conducting member is located between an interior portion of the shank and an outer sleeve, the conducting member extending substantially along the length of the shank with a first segment of the conducting member extending from a first proximal portion of the shank towards a second distal portion of the shank and a second segment of the conducting member extending from the second distal portion of the shank towards the first proximal portion of the shank and wherein the first and second segments form a continuous length of the conducting member.

10. An electronic bolt seal assembly in accordance with claim 1 further comprising a global positioning system (GPS) receiving unit coupled to the electronic circuit of the electronic module for receiving and processing electronic bolt positioning signals from GPS satellites.

11. An electronic bolt seal assembly in accordance with claim 10 wherein the housing comprises an outwardly projecting hollow cavity for accommodating an antenna operably coupled with the GPS receiving unit.

12. An electronic bolt seal assembly in accordance with claim 11 wherein the housing is shaped to prevent the shank from being engaged with the hasp of a cargo container in an undesirable orientation thereby preventing outer walls of the housing defining the hollow cavity for the antenna from being positioned in close proximity with outer walls of the container.

13. An electronic bolt seal assembly in accordance with claim 1 wherein during use the head of the bolt and the associated housing is adapted to be positioned at a greater elevation relative to the locking body in the locked configuration.

14. An electronic bolt seal assembly in accordance with claim 1 wherein the communication device comprises a cellular phone communications unit coupled to an electronic circuit, the cellular phone communications unit being arranged to communicate with the communications center via cellular towers.

15. An electronic bolt seal assembly in accordance with claim 1 comprising a cellular modem coupled to an electronic circuit of the electronic module for communicating position data to a cellular network; and a global positioning system (GPS) receiver coupled to the electronic circuit of the electronic module for receiving and processing position data from GPS satellites whereby the tracking and communication devices further comprise a processor coupled to the GPS receiver and the cellular modem and programmed to control operation of the GPS receiver and the cellular modem.

16. An electronic bolt seal assembly in accordance with claim 1 wherein the tracking and communication devices comprise a global positioning system (GPS) receiver coupled to the electronic circuit of the electronic module for receiving and processing position data from GPS satellites; and a small satellite (smallsat) receiver coupled to the electronic circuit of the electronic module for communicating with a small satellite network.

17. An electronic bolt seal assembly in accordance with claim 1 wherein the tracking and communication devices comprise a global positioning system (GPS) receiver coupled to the electronic circuit of the electronic module for receiving and processing position data from GPS satellites; a small satellite (smallsat) receiver coupled to the electronic circuit of the electronic module for communicating with a communication satellite network; and a cellular modem coupled to an electronic circuit of the electronic module for communicating position data to a cellular network.

* * * * *